United States Patent
Miki

(10) Patent No.: US 9,804,674 B2
(45) Date of Patent: Oct. 31, 2017

(54) TACTILE SENSATION PROVIDING APPARATUS

(75) Inventor: Tomohiro Miki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 214 days.

(21) Appl. No.: 13/516,165

(22) PCT Filed: Sep. 13, 2010

(86) PCT No.: PCT/JP2010/005578
§ 371 (c)(1),
(2), (4) Date: Jun. 14, 2012

(87) PCT Pub. No.: WO2011/074159
PCT Pub. Date: Jun. 23, 2011

(65) Prior Publication Data
US 2012/0293435 A1     Nov. 22, 2012

(30) Foreign Application Priority Data
Dec. 14, 2009 (JP) .................................. 2009-283032

(51) Int. Cl.
*G06F 3/041* (2006.01)
*G06F 3/01* (2006.01)

(52) U.S. Cl.
CPC ................................... *G06F 3/016* (2013.01)

(58) Field of Classification Search
None
See application file for complete search history.

(56) References Cited

U.S. PATENT DOCUMENTS

| | | | |
|---|---|---|---|
| 5,734,373 A * | 3/1998 | Rosenberg | A63F 13/06 345/161 |
| 5,761,644 A | 6/1998 | Ueda et al. | |
| 7,505,030 B2 * | 3/2009 | Cunningham | G09B 23/30 345/156 |

(Continued)

FOREIGN PATENT DOCUMENTS

| | | |
|---|---|---|
| JP | 08-055130 A | 2/1996 |
| JP | 2001-236156 A | 8/2001 |

(Continued)

OTHER PUBLICATIONS

International Search Report; PCT/JP2010/005578; dated Dec. 14, 2010.

(Continued)

*Primary Examiner* — Bryan Earles
(74) *Attorney, Agent, or Firm* — Studebaker & Brackett PC

(57) ABSTRACT

When an operation to a touch sensor 11 is detected in a first operation state in which a main control unit 16 is not busy with data processing, a tactile sensation provision control unit 14 controls a tactile sensation providing unit 13 to vibrate a touch face 11a in a first vibration mode such that a first tactile sensation is provided to an operation object. On the other hand, when the operation is detected in a second operation state in which the main control unit 16 is busy with data processing, the touch face 11a is vibrated in a second vibration mode such that a second vibration is provided to the operation object. Since different tactile sensations are provided, an operator may recognize whether processing corresponding to the operation may be executed. Thereby, re-inputs are minimized.

5 Claims, 3 Drawing Sheets

(56) References Cited

U.S. PATENT DOCUMENTS

| | | | |
|---|---|---|---|
| 2001/0017633 A1 | 8/2001 | Sameda et al. | |
| 2004/0189712 A1 | 9/2004 | Rundell | |
| 2005/0093817 A1* | 5/2005 | Pagan | G06F 3/016 |
| | | | 345/156 |
| 2006/0109256 A1 | 5/2006 | Grant et al. | |
| 2007/0035526 A1* | 2/2007 | Takenaka et al. | 345/173 |
| 2008/0068350 A1* | 3/2008 | Rosenberg et al. | 345/173 |
| 2008/0111788 A1* | 5/2008 | Rosenberg et al. | 345/156 |
| 2008/0153554 A1* | 6/2008 | Yoon et al. | 455/567 |
| 2008/0184042 A1* | 7/2008 | Parks et al. | 713/300 |
| 2008/0296072 A1 | 12/2008 | Takashima et al. | |
| 2010/0156818 A1* | 6/2010 | Burrough et al. | 345/173 |
| 2010/0257490 A1* | 10/2010 | Lyon et al. | 715/863 |
| 2012/0299857 A1 | 11/2012 | Grant et al. | |

FOREIGN PATENT DOCUMENTS

| | | |
|---|---|---|
| JP | 2003-288158 A | 10/2003 |
| JP | 2005-284416 A | 10/2005 |
| JP | 2006-521610 A | 9/2006 |
| JP | 2008-516348 A | 5/2008 |
| JP | 2008-130055 A | 6/2008 |

OTHER PUBLICATIONS

An Office Action; "Notice of Reason for Rejection," issued by the Japanese Patent Office dated Nov. 19, 2013, which corresponds to Japanese Patent Application No. 2009-283032 and is related to U.S. Appl. No. 13/516,165; with English concise explanation.

* cited by examiner (a)

(b)

TACTILE SENSATION PROVIDING APPARATUS

CROSS REFERENCE TO RELATED APPLICATION

This application claims priority to and the benefit of Japanese Patent Application No. 2009-283032 filed on Dec. 14, 2009, the entire contents of which are incorporated herein by reference.

TECHNICAL FIELD

The present invention relates to a tactile sensation providing apparatus having a touch sensor.

BACKGROUND ART

In recent years, input apparatus such as operation units, switches and the like having touch sensors such as touch panels, touch switches and the like to receive input operations by operators have been widely used for mobile terminals such as mobile phones, information equipment such as calculators and ticket vending machines, home electric appliances such as microwaves, TV sets and lighting equipment, industrial equipment (FA equipment) and the like.

There are known a variety of types of those touch sensors, such as a resistive film type, a capacitive type, an optical type and the like. However, touch sensors of these types receive a touch input (input operation) by a pressing object (pressing means) such as a finger or a stylus pen and, unlike push-button switches, the touch sensors themselves are not physically displaced when being touched.

As such, there is suggested an input apparatus which includes a control unit for monitoring an input to the touch sensor and, when the input is detected, drives a piezoelectric element via a piezoelectric element control unit to vibrate the touch sensor such that a tactile sensation is provided at operator's fingertip as feedback (for example, see Patent Documents 1, 2).

RELATED ART DOCUMENTS

Patent Documents

Patent Document 1: Japanese Patent Laid-Open No. 2003-288158
Patent Document 2: Japanese Patent Laid-Open No. 2008-130055

SUMMARY OF INVENTION

Technical Problem

Incidentally, the input apparatus may take time for input processing. For example, the input apparatus having the touch sensor incorporated with a display device may take time to change some display panels in input processing.

In this case, even when the feedback is provided in response to the input operation after detection of the input as described above, since the display panel is not changed due to the input processing taking time, the operator may misunderstand that the input is not received and re-input. However, since the control unit is in a busy state at this time, the control unit cannot control to provide the feedback in response to the re-input. Therefore, the operator misunderstands that the re-input is not received either and repeats the input operation, which may be stressful to the operator. Even when the touch sensor is not incorporated with the display device, such a re-input may be carried out when the input processing takes time such as when the control unit is performing multitask.

In order to minimize such unnecessary input operations, an option is considered, for example, to supply an input detection signal to the touch sensor and also to a piezoelectric element control unit such that, independently from the control unit for executing the input processing, the piezoelectric element control unit performs feedback control for the input operation.

In this case, however, even when the control unit is busy with the input processing and unable to execute input processing of another input operation, the feedback control is performed for the input operation. Therefore, when the control unit is in the busy state, the operator may believe that the display panel is not changed despite that the input is received and repeat the re-input until the display panel is changed. As a result, more load such as a detection operation for detecting an input to the touch sensor and the like is imposed on the control unit, further slowing down a processing speed of the control unit.

There also is an input apparatus which stores input information, when the control unit is in the busy state, in a memory unit and, when the control unit becomes ready for receiving an input, retrieves the input information stored in the memory unit, and sequentially performs operations. In using such an input apparatus, when the re-input is repeated as described above, since the input operation performed in the busy state is performed before change of the display panel to a predetermined display panel, unintended operations may be executed due to the re-input to some input panels before and after the change.

Accordingly, an object of the present invention in consideration of such problems is to provide a tactile sensation providing apparatus capable of minimizing the re-operation to prevent from imposing stress on the operator and effectively avoiding performing the unintended operations.

Solution to Problem

In order to achieve the above object, a tactile sensation providing apparatus according to a first aspect of the present invention includes:
 a touch sensor;
 a main control unit configured to process data;
 a tactile sensation providing unit configured to vibrate a touch face of the touch sensor;
 an operation detection unit configured to detect an operation to the touch sensor; and
 a tactile sensation provision control unit configured to control drive of the tactile sensation providing unit, wherein
 the main control unit outputs a state signal indicating a first operation state in which the main control unit is not busy with data processing or a second operation state in which the main control unit is busy with data processing, and
 the tactile sensation provision control unit, based on the state signal, vibrates the tactile sensation providing unit in a first vibration mode when the operation detection unit detects the operation in the first operation state such that a first tactile sensation is provided to an operation object on the touch face, and vibrates the tactile sensation providing unit in a second vibration mode when the operation detection unit detects the operation in the second operation state such that a second tactile sensation is provided to the operation object.

A second aspect of the present invention is the tactile sensation providing apparatus according to the first aspect, wherein the tactile sensation providing unit has a piezoelectric element, and the operation detection unit detects the operation based on an output of the piezoelectric element.

A third aspect of the present invention is the tactile sensation providing apparatus according to the first aspect, wherein the operation detection unit detects the operation based on an output of the touch sensor.

A fourth aspect of the present invention is the tactile sensation providing apparatus according to the first aspect, further including a display unit configured to display a panel for allowing the touch sensor to detect a touch input.

Effect of the Invention

According to the tactile sensation providing apparatus of the present invention, since different tactile sensations are provided, the operator may recognize whether processing corresponding to an operation may be executed at a point of operating. Thereby, misoperations may be minimized Accordingly, the tactile sensation providing apparatus having an excellent convenience, as capable of preventing from imposing stress on an operator and effectively avoiding performing unintended operations, may be provided.

BRIEF DESCRIPTION OF DRAWINGS

FIG. 2(a) is a cross-sectional view of a main section, and FIG. 2(b) is a plane view of the main section.

DESCRIPTION OF EMBODIMENTS

Embodiments of the present invention will be described with reference to the accompanying drawings.

(First Embodiment)

Figure 1:
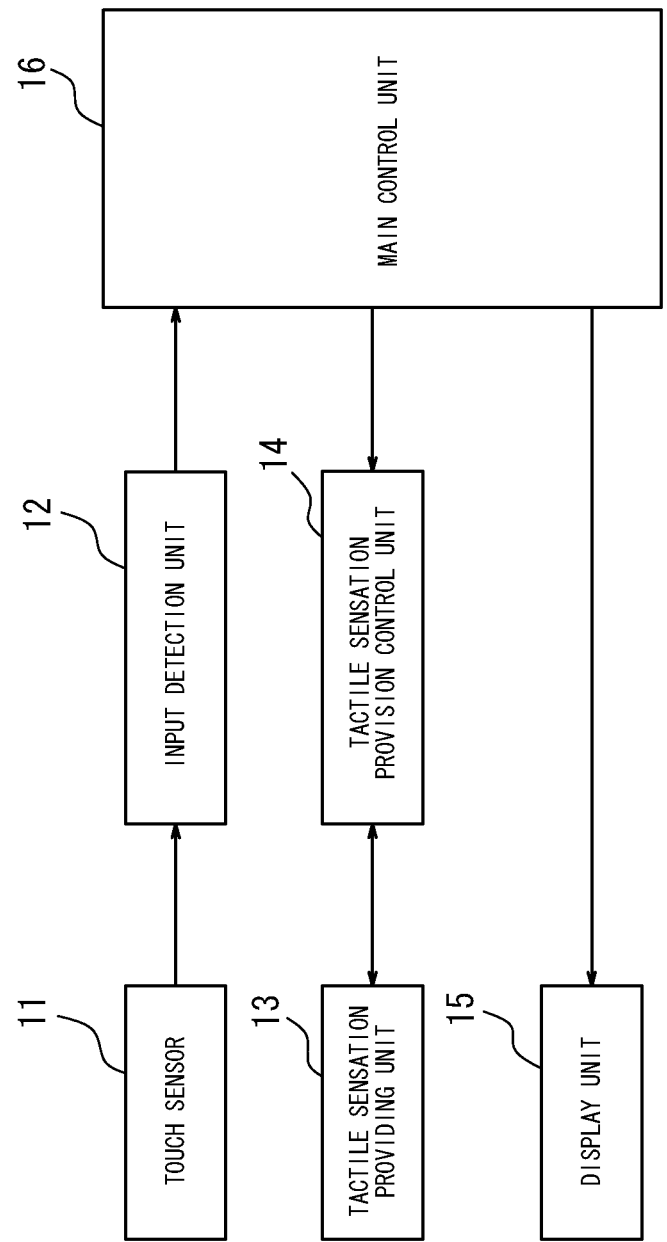
FIG. 1 is a block diagram illustrating a schematic configuration of a tactile sensation providing apparatus according to a first embodiment of the present invention.

FIG. 1 is a block diagram illustrating a schematic configuration of a tactile sensation providing apparatus according to a first embodiment of the present invention. The tactile sensation providing apparatus includes a touch sensor 11, an input detection unit 12, a tactile sensation providing unit 13, a tactile sensation provision control unit 14, a display unit 15, and a main control unit 16. The touch sensor 11 receives a touch input (touch operation) to the display unit 15 by a pressing means (operation object) such as a finger and the like and may include a known type such as a resistive film type, a capacitive type, an optical type and the like. The input detection unit 12 detects input position information corresponding to an operation to a touch face 11a (see FIG. 2) of the touch sensor 11 by the pressing means based on an output of the touch sensor 11. Then, detection information (for example, a task) corresponding to the operation is supplied to the main control unit 16.

The tactile sensation providing unit 13 vibrates the touch sensor 11 and is constituted by using, for example, a piezoelectric element. The tactile sensation providing unit 13 is driven by the tactile sensation provision control unit 14 based on a tactile sensation providing command signal from the main control unit 16. Thereby, the tactile sensation providing unit 13 vibrates the touch sensor 11. The display unit 15 displays a panel based on an application or OS (Operating System). The display unit 15 displays, for example, an input object (a touch input panel) such as an input button like a push-button switch (push-type button switch) in the panel. The display unit 15 is constituted by using, for example, a liquid crystal display panel, an organic EL display panel or the like.

The main control unit 16 processes a variety of data. The main control unit 16 processes corresponding data based on the detection information from the input detection unit 12 and controls a display operation of the display unit 15 in accordance with processing.

Figure 2:
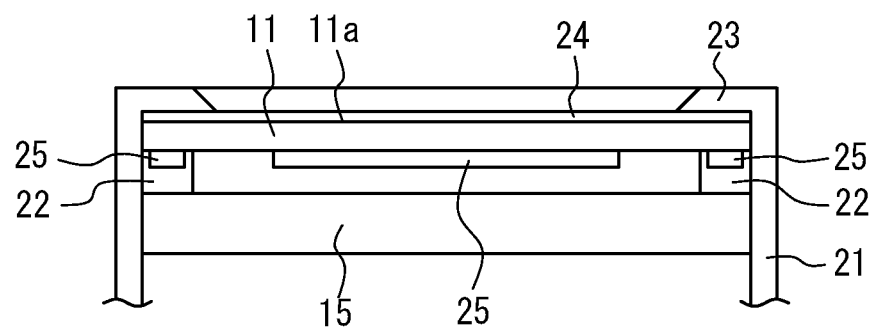
FIG. 2 illustrates an exemplary implementation structure of a part including a touch sensor, a tactile sensation providing unit and a display unit illustrated in FIG. 1.
Figure 2:
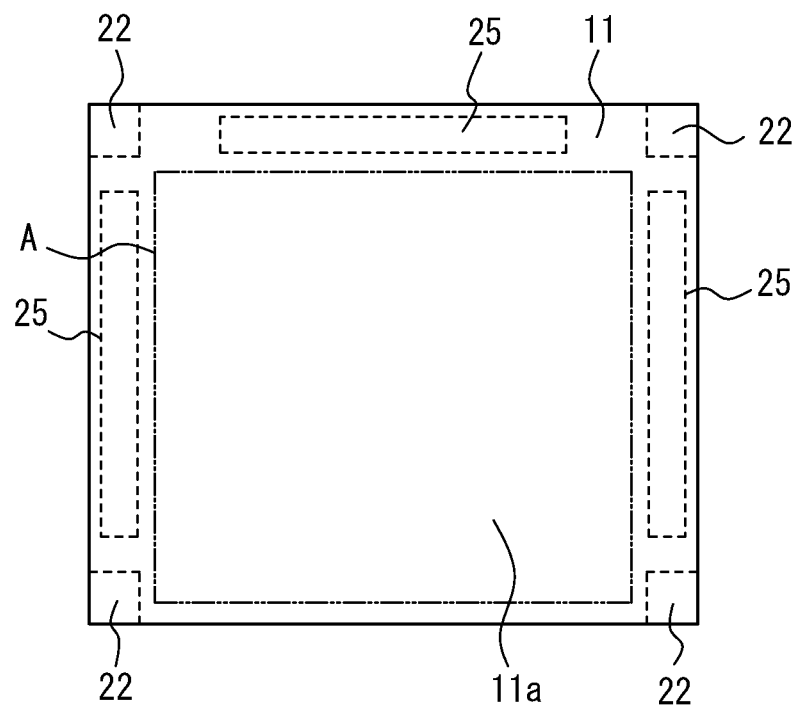

FIG. 2 illustrates an exemplary implementation structure of the touch sensor 11, the tactile sensation providing unit 13 and the display unit 15 illustrated in FIG. 1; FIG. 2(a) is a cross-sectional view of a main section, and FIG. 2(b) is a plane view of the main section. The display unit 15 is contained in a housing 21. The touch sensor 11 is held on the display unit 15 via insulators 22 made of elastic members. According to the present embodiment, the touch sensor 11 is held on the display unit 15 via the insulators 22 arranged at four corners outside a display area A of the display unit 15 indicated by a chain double-dashed line in FIG. 2(b).

In addition, the housing 21 is provided with an upper cover 23 covering a surface area of the touch sensor 11 outside the display area of the display unit 15. An insulator 24 made of elastic member is arranged between the upper cover 23 and the touch sensor 11.

The touch sensor 11 illustrated in FIG. 2 may have, for example, a surface member having the touch face 11a and constituted by using a transparent film or glass, and a rear face member made of glass or acryl. The touch sensor 11 is designed such that, when the touch face 11a is pressed down via the insulator 24, the pushed position or an entire structure is bent (strained) slightly in accordance with a pressure force.

A piezoelectric element 25 is provided on the rear face of the touch sensor 11 at a position covered by the upper cover 23 and close to one or a plurality of sides (here, for example, three sides). These three piezoelectric elements 25 function as the tactile sensation providing unit 13 to vibrate the touch sensor 11 such that the tactile sensation is provided to the pressing means (operation object) pressing the touch face 11a. These three piezoelectric elements 25 are connected to the tactile sensation provision control unit 14 (see FIG. 1) in parallel. It is to be noted that the housing 21, the upper cover 23 and the insulator 24 illustrated in FIG. 2(a) are omitted in FIG. 2(b).

According to the tactile sensation providing apparatus of the present embodiment, the main control unit 16 outputs a state signal indicating a mode of the control unit 16 itself to the tactile sensation provision control unit 14. The state signal indicates a first operation state (for example, a high level) in which the main control unit 16 is not busy (in a non-busy state) with data processing or a second operation state (for example, a low level) in which the main control unit 16 is busy with data processing.

The tactile sensation provision control unit 14, by utilizing piezoelectric effect of the piezoelectric elements 25 functioning as the tactile sensation providing unit 13, detects an operation to press (push) the touch sensor 11. According to the present embodiment, that is, the tactile sensation provision control unit 14 functions as an operation detection unit. The tactile sensation provision control unit 14 controls drive of the piezoelectric elements 25 based on outputs of the piezoelectric elements 25 and the state signal from the main control unit 16.

That is, when the state signal indicates the first operation state and the tactile sensation provision control unit 14 detects an operation to the touch face 11a based on the outputs of the piezoelectric elements 25, the tactile sensation provision control unit 14 vibrates the piezoelectric elements 25 in a first vibration mode. Thereby, a first tactile sensation is provided to the operation object operating the touch face 11a. On the other hand, when the state signal indicates the second operation state and the tactile sensation provision control unit 14 detects an operation based on the outputs of the piezoelectric elements 25, the tactile sensation provision control unit 14 vibrates the piezoelectric elements 25 in a second vibration mode. Thereby, a second tactile sensation different from the first tactile sensation is provided to the operation object operating the touch face 11a.

A vibration pattern of the piezoelectric elements 25 in the first vibration mode may be set appropriately by a drive signal to be applied to the piezoelectric elements 25. For example, in order to provide a click sensation "Cli" obtained when pressing the push-button switch, the drive signal, a sine wave with a predetermined frequency such as 100 Hz to 200 Hz, preferably 170 Hz, is applied to the piezoelectric elements 25 for one cycle such that the touch face 11a is vibrated by approximately 15 μm. Thereby, a realistic click sensation is provided to the operator as the first tactile sensation via the operation object (pressing means) pressing the touch face 11a of the touch sensor 11, and thus the operator may recognize that an input operation is completed. In releasing the operation object, the piezoelectric elements 25 are driven with the drive signal similar to that in pressing such that a similar click sensation (in this case, a release sensation) is provided. Thereby, a more realistic click sensation including the click sensation "Cli" in pressing and a click sensation "Ck" in releasing may be provided. It is to be understood that the drive signal for providing the release sensation does not necessarily need to be identical to that for providing the click sensation. In order to provide a "ticking" sensation harder than the click sensation "Cli", the drive signal, a sine wave or a square wave with a frequency of approximately 200 Hz to 500 Hz, is applied for one cycle.

A vibration pattern of the piezoelectric element 25 in the second vibration mode, similarly to that in the first vibration mode, may be appropriately set by the drive signal to be applied to the piezoelectric elements 25. In order to provide a soft tactile sensation such as, for example, a "throbbing" sensation and a "jelly-like" sensation as the second tactile sensation, the drive signal, a sine wave with a frequency of approximately 200 Hz to 500 Hz, is applied for two or three cycles. Alternatively, in order to provide a "vibrating" sensation, the drive signal, a sine wave with a frequency of approximately 200 Hz to 500 Hz, is applied for four or more cycles. Preferably, information on the drive signals to provide those various tactile sensations is stored in a memory unit (not illustrated) such that the user can appropriately set the drive signal to provide a desired tactile sensation. The tactile sensations such as the click sensations "Cli" and "Ck", the "throbbing" sensation, the "jelly-like" sensation and the "vibrating" sensation set forth in the present specification are Japanese expressions of the sensations obtained by the operator. Examples of the drive signals to provide actual tactile sensations are described above.

According to the tactile sensation providing apparatus of the present embodiment, the input detection unit 12, the tactile sensation provision control unit 14 and the main control unit 16 may be constituted by using software to be executed by any appropriate processor such as a CPU and the like, or by using a dedicated processor (for example, a digital signal processor (DSP)) specialized for each operation. Also, the input detection unit 12 and the tactile sensation provision control unit 14 may configure sub-control units.

According to the tactile sensation providing apparatus of the present embodiment, as described above, when an operation to the touch sensor 11 is detected in the first operation state in which the main control unit 16 is not busy with data processing, the touch face 11a is vibrated in the first vibration mode such that the first tactile sensation is provided to the operation object. On the other hand, when an operation to the touch sensor 11 is detected in the second operation state in which the main control unit 16 is busy with data processing, the touch face 11a is vibrated in the second vibration mode such that the second tactile sensation is provided to the operation object. Accordingly, since the different tactile sensations are provided, the operator, upon operating the touch sensor, may recognize whether processing corresponding to the operation may be executed. Thereby, re-inputs may be minimized. Hence, imposing stress on the operator may be prevented and unintended operations may be effectively avoided, thus offering further improved convenience.

(Second Embodiment)

Figure 3:
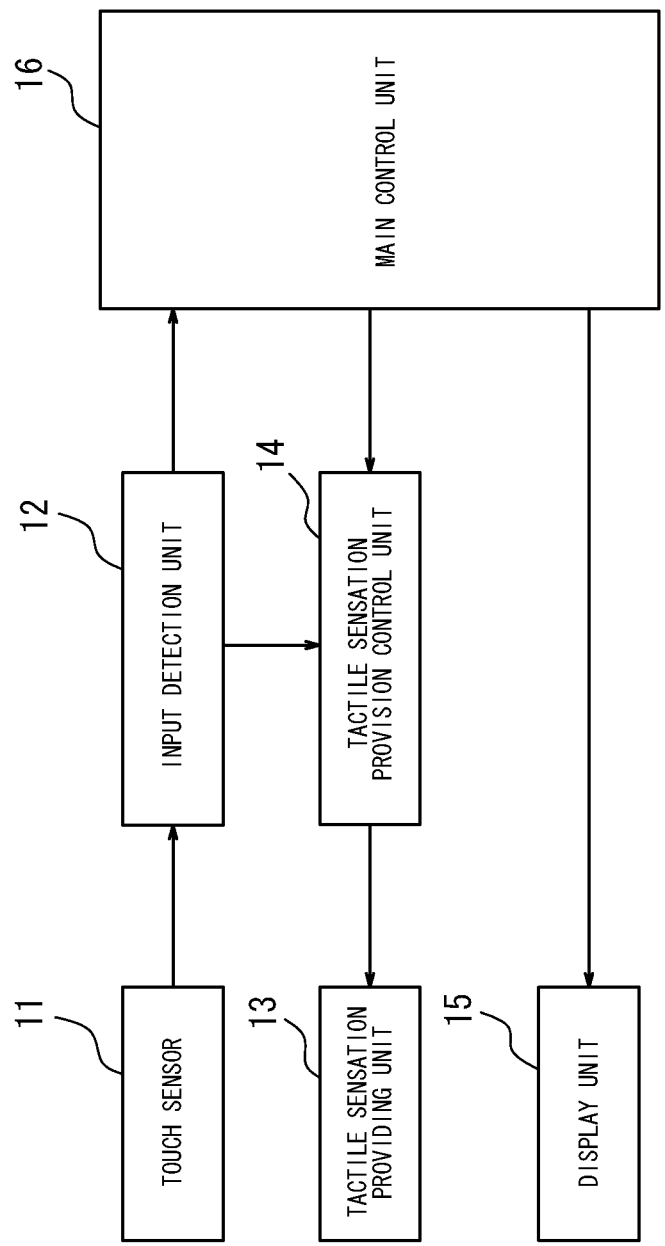
FIG. 3 is a block diagram illustrating a schematic configuration of a tactile sensation providing apparatus according to a second embodiment of the present invention.

FIG. 3 is a block diagram illustrating a schematic configuration of a tactile sensation providing apparatus according to a second embodiment of the present invention. This tactile sensation providing apparatus has a configuration similar to that of the first embodiment except for detecting an operation based on an output of the input detection unit 12 instead of the outputs of the piezoelectric elements 25. That is, the input detection unit 12 functions as the operation detection unit. The input detection unit 12 supplies the tactile sensation provision control unit 14 with the detection information of the operation object detected by the touch sensor 11 or a signal corresponding to the detection information, that is, a signal indicating the detection information.

When the state signal from the main control unit 16 indicates the first operation state and the input detection unit 12 detects an operation to the touch face 11a, the tactile sensation provision control unit 14, similarly to the first embodiment, vibrates the tactile sensation providing unit 13 in the first vibration mode. On the other hand, when the state signal from the main control unit 16 indicates the second operation state indicating that the main control unit 16 is busy and the input detection unit 12 detects an operation to the touch face 11a, the tactile sensation provision control unit 14 vibrates the tactile sensation providing unit 13 in the second vibration mode. The vibration in the first vibration mode and that in the second vibration mode may be different from each other. According to the input apparatus of the present embodiment, therefore, an effect similar to that of the first embodiment may be obtained.

It is to be understood that the present invention is not limited to the above embodiments but may be modified or changed in numerous manners. For example, the operation detection unit may include both of the configuration in the first embodiment and that in the second embodiment. Also, the operation detection unit configured to detect an operation to the touch sensor 11 may be constituted by using a dedicated operation detection element such as a strain sensor or the piezoelectric element provided to the touch sensor 11 separately from the piezoelectric elements configured to provide the tactile sensation. Further, although the touch sensor 11 is integrally provided on the display unit 15, the present invention is applicable also to a configuration in which the display unit 15 and the touch sensor 11 are spatially separated from each other and a configuration in which the display unit 15 is omitted.

REFERENCE SIGNS LIST

11 touch sensor
11a touch face
12 input detection unit
13 tactile sensation providing unit
14 tactile sensation provision control unit
16 main control unit

The invention claimed is:

1. A tactile sensation providing apparatus comprising:
a touch sensor;
a main control unit configured to process data;
a tactile sensation providing unit comprising a first piezoelectric element configured to vibrate a touch face of the touch sensor based on a signal from the main control unit to provide a first tactile sensation and a second tactile sensation to an operation object on the touch face;
an operation detection unit configured to detect an operation to the touch sensor; and
a tactile sensation provision control unit configured to control drive of the tactile sensation providing unit, wherein
the main control unit outputs a state signal indicating a first operation state in which the main control unit is not busy in taking time for executing data processing or a second operation state in which the main control unit is busy in taking time for executing data processing,
the tactile sensation provision control unit, based on the state signal, vibrates the tactile sensation providing unit in a first vibration mode when the operation detection unit detects the operation in the first operation state such that the first tactile sensation is provided to the operation object on the touch face, and vibrates the tactile sensation providing unit in the second vibration mode when the operation detection unit detects the operation in the second operation state such that a second tactile sensation is provided to the operation object,
the operation detection unit comprises a second piezoelectric element that does not provide a tactile sensation, wherein the second piezoelectric element detects an operation to the touch sensor, and
the operation detection unit is configured to directly supply the tactile sensation provision control unit with detection information of the operation object detected by the touch sensor or a signal corresponding to the detection information.

2. The tactile sensation providing apparatus according to claim 1, wherein the operation detection unit detects the operation based on an output of the first piezoelectric element.

3. The tactile sensation providing apparatus according to claim 1, wherein the operation detection unit detects the operation based on an output of the touch sensor.

4. The tactile sensation providing apparatus according to claim 1, further comprising a display unit configured to display an interface for allowing the touch sensor to detect a touch input.

5. The tactile sensation providing apparatus according to claim 1, wherein the first tactile sensation is like a tactile sensation obtained when a push-button switch is pressed and the second tactile sensation is different from the first tactile sensation.

* * * * *